June 7, 1966  C. E. SCHOU  3,254,541
COMPACT MULTI-SPEED FORWARD AND REVERSE TRANSMISSION
Filed July 15, 1963  4 Sheets-Sheet 1

INVENTOR
CARL E. SCHOU
BY Strauch, Nolan
& Neale
ATTORNEYS

INVENTOR.
CARL E. SCHOU
BY
Strauch, Nolan & Neale
ATTORNEYS

June 7, 1966   C. E. SCHOU   3,254,541
COMPACT MULTI-SPEED FORWARD AND REVERSE TRANSMISSION
Filed July 15, 1963   4 Sheets-Sheet 4

INVENTOR
CARL E. SCHOU
BY Strauch, Nolan & Neale
ATTORNEYS

United States Patent Office 3,254,541
Patented June 7, 1966

3,254,541
COMPACT MULTI-SPEED FORWARD AND
REVERSE TRANSMISSION
Carl E. Schou, Bloomfield Hills, Mich., assignor, by mesne assignments, to Rockwell-Standard Corporation, a corporation of Delaware
Filed July 15, 1963, Ser. No. 294,856
8 Claims. (Cl. 74—360)

The present invention relates to vehicle drive mechanisms and is more particularly concerned with a fast acting vehicle transmission having a plurality of forward and reverse speeds.

Maneuverability is a primary requisite of industrial and loading vehicles of the shop lifting and pay-loader type. In the past, much attention has been directed toward improvements to facilitate rapid shift between forward and reverse drives and more recently attention has been given to providing more than one speed in both forward and reverse. However, efforts to equip lifting and loading vehicles with multi-speed transmissions have been hampered because such vehicles lack the space required by conventional multi-speed transmissions due to the presence of auxiliary lifting and loading mechanisms thereon. Consequently, most conventional lifting and loading vehicles employ transmission units with one forward drive and one reverse drive. Those lifting and loading vehicles using multi-speed forward and reverse transmission conventionally utilize the complex heavy, bulky, separate shift mechanisms for each forward and reverse gear and traditionally include some type of idler gear arrangement to operate the reverse drives. Such massive transmission units have proved to be generally unsatisfactory.

The present invention therefore contemplates and has as a primary purpose the provision of a novel, compact, light weight, multi-speed vehicle transmission having plural clutch assemblies to facilitate quick and easy shifting between any one of the several forward or reverse drives, to thereby overcome the above recited disadvantages encountered in prior multi-speed transmissions for lifting or loading vehicles.

Accordingly, with the foregoing considerations in mind, it is a major object of this invention to provide, in a drive train for trucks of the shop lift and pay loader type, a novel multi-speed forward and reverse drive transmission which is not subject to the hitherto encountered weight and space disadvantages.

It is further the object of this invention to provide a reversible vehicle power transmission in which the engine is directly coupled to an output shaft by a novel gear train and clutch assembly which facilitates selective control of the speed and direction of movement of the output shaft.

It is further the object of this invention to provide a novel multi-speed forward and reverse transmission which eliminates the conventional idler gear mechanism for reverse drive by employing a novel arrangement of the forward and reverse units.

Still another object is to provide a multi-speed forward and reverse vehicle transmission of balanced design having a simplified novel hydraulic mechanism for repeated quick and easy shifting to change the speed and/or direction of the drive and which thereby avoids over heating and excessive wear of the mechanism.

It is a further object of the present invention to provide a multi-speed forward and reverse vehicle transmission having a simplified novel hydraulic gear engaging and driving mechanism including a novel series of clutch devices of the multiple disc type for repeated quick and easy shifting to change the speed and/or direction of the drive without any change in the relative locations of the gears thereof in which the disc plates of the clutch devices are cooled by applying a liquid coolant to the surface of the plate.

Still another object of this invention is to provide a multi-speed forward and reverse vehicle transmission having a simplified novel hydraulic gear engaging and driving mechanism including a novel series of clutch devices for repeated quick and easy shifting to change speed and/or direction of the drive and means for simultaneous prevention of inadvertant application of both forward and reverse clutch devices.

A further object of this invention is to provide a novel, compact, versatile, multi-speed forward and reverse transmission especially adapted for industrial vehicle applications which allows quick shifting from any one speed in one direction to another speed in that direction or to the same or another speed in the opposite direction, without placing undue wear and strain on the transmission parts and without excessive noise.

Other objects and novel features will become apparent by reference to the appended claims and as the description proceeds in connection with the accompanying drawings wherein:

Figure 1:
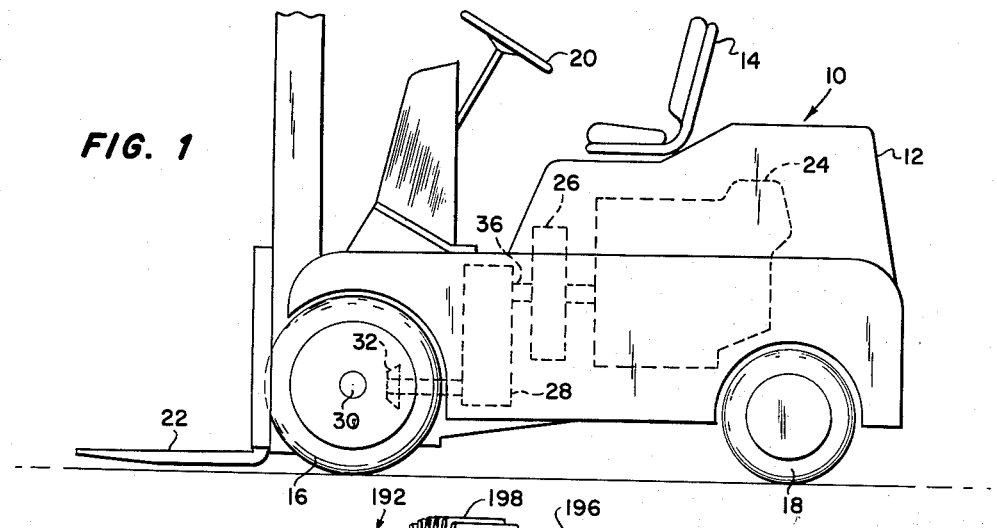
FIGURE 1 is a side elevation of an industrial lift truck embodying the drive mechanism of the present invention.

The lift truck 10 shown in FIGURE 1 is of conventional construction except for the incorporation of the transmission of the present invention. The truck has a body 12, an operator's seat 14 mounted on the body between the front ground-engaging drive wheels 16 and the rear ground-engaging steering wheels 18, a steering wheel 20 suitably connected to the rear wheels 18 and lift forks 22. The lift truck 10, constituting one embodiment of the present invention, also comprises a prime mover 24 such as an internal combustion engine mounted on the truck chassis (not shown), a fluid torque converter 26 drive connected to the prime mover, a clutch and transmission unit 28, which forms an important part of the present invention, connected to the output of the torque converter by shaft 36 and a forward rear axle type drive unit 30 which drives wheels 16. Power is transmitted to the axle drive unit 30 from a suitable differential and bevel gear set (not shown) which is connected to the output of the transmission unit 28 by a pinion 32.

Fluid torque converter 26, which is housed in casing 34 (FIGURE 4) is of suitable standard construction including output shaft 36 which is supported by bearing assembly 48 and splined connected at 38 to gear 40, held in place by a snap ring 44.

Figure 2:
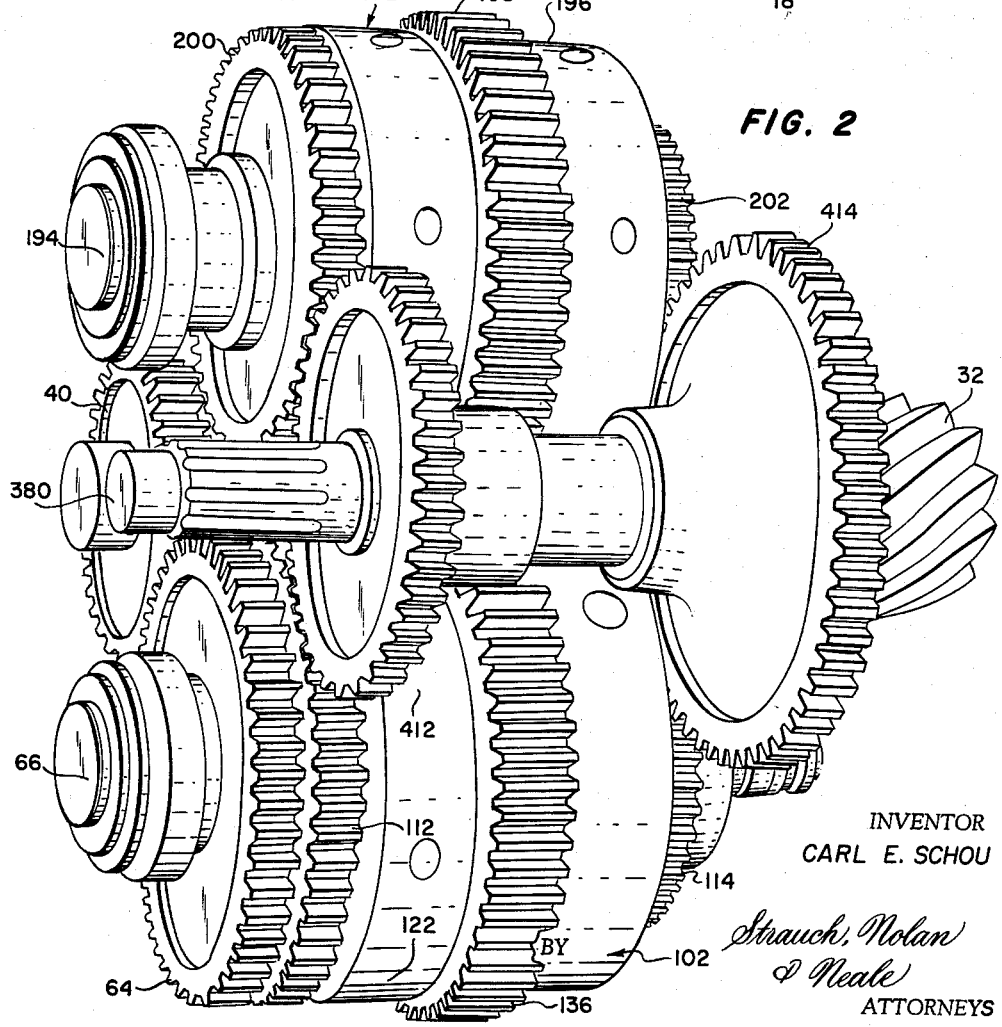
FIGURE 2 is a perspective view of the transmission of the truck of FIGURE 1 with the housing thereof removed to illustrate the novel arrangement of the forward and reverse gear trains with respect to the input and output members.

The unique relationship shown in FIGURE 2 between the several parts of the transmission unit enables torque converter gear 40 to drive pinion 32 in a forward or a reverse direction and at different speeds without the need of a reverse idler gear. This is accomplished by constructing the transmission so that each gear is in constant mesh with one or more companion gears; i.e. gear 40 with input gear 64, high speed forward gear 112 and high speed reverse gear 200 with high speed forward and reverse output gear 412 splined on shaft 380, low speed forward gear 114 and low speed reverse gear 202 with low speed forward and reverse output gear 414 splined on shaft 380, and collar gear 136 with reverse collar gear 198. The size of these gears controls their respective speeds. Hence, reverse output shaft 380 and pinion 32 may be selectively driven in a forward direction at different speeds by gears 112 and 114 or in a reverse direction by gears 200 or 202. During power engagement of any one of gears 112, 114, 200 or 202, the remaining three of these gears idle on their respective shafts.

Figure 4:
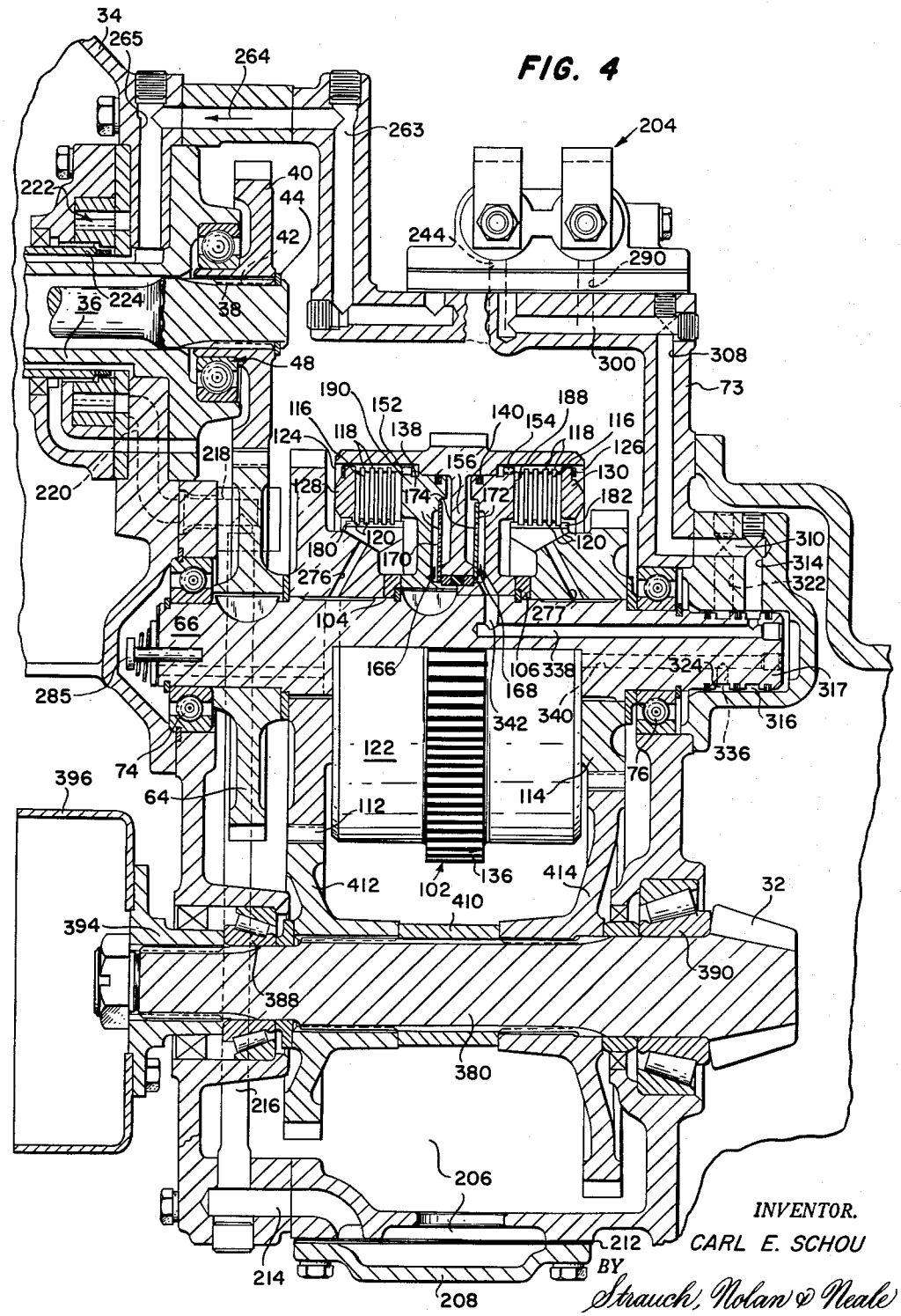
FIGURE 4 is a cross-section taken along line 4—4 of FIGURE 3 illustrating the multi-speed forward drives and associated clutch arrangements of the transmission.

Considering the forward drive portion of transmission 28, cross shaft 66, journalled in transmission housing 73 by ball bearings 74 and 76 vertically below and horizontally adjacent shaft 36, is keyed to gear 64 and supports forward dual friction clutch and gear assembly 102 (FIGURE 4). The internal clutch structure of 102 is substantially similar to the clutch assembly disclosed in Patent No. 3,040,480, which may be referred to for greater particularly as to assembly and operation. Assembly 102 is held in place on shaft 66 between spacer rings 104 and 106 by snap rings, and functions to selectively couple shaft 66 with either high speed forward gear 112, low speed forward gear 114 or to permit these gears to idle as will become apparent as the description proceeds.

Assembly 102 embodies a dual pressure plate structure, 116 on each side, each structure having axially spaced annular pressure plates 118 alternately placed between dual backing plates 120 for friction engagement. The clutch assembly of 102 also includes pressure plate structure 116 which comprises a cylindrical clutch shift collar 122 concentric with cross shaft 66, having peripheral splines 124 and 126 internal of collar 122 interfitting with the outer peripheral splines of pressure plates 118, and includes ring shaped pressure plates 128 and 130 held within the clutch collar by snap rings. Gears 112 and 114 are each rotatably held on shaft 66 by spacer rings and are splined at 180 and 182, respectively, to backing plates 120.

Along the external periphery of collar 122 is integral collar gear 136 and concentrically mounted within collar 122 are clutch drums 138 and 140 appropriately keyed to shaft 66. Clutch collar 122 is axially slidable along the outer peripheral surfaces of clutch drums 138 and 140, which are also splined at 152 and 154, respectively, for driving engagement with collar splines 124 and 126. Hence, shaft 66 will rotate clutch drums 138 and 140, collar 122 and collar gear 136 as a unit.

Radially extending flange piston 156 of collar 122 functions as a double acting piston located between clutch drums 138 and 140 to form one wall of each of a pair of sealed annular chambers 166 and 168 and to provide a pressure bearing surface to enable fluid under pressure to slide collar 122 axially to friction engage plates 118 and 120 and thereby drive pinion 32 by means of gear 112 or 114. Discs 170 and 172, preferably bellville-type springs, are preloaded to abut clutch drum 138 and flange piston 156, and clutch drum 140 and flange piston 156, respectively, so as to urge the clutch drums and flange piston 156 toward neutral position as shown in FIGURE 4 and more particularly described in Patent No. 3,040,408. Fluid reaches the surface of piston 156 through perforations 174 in discs 170 and 172.

When collar 122 is selectively shifted to the left (FIGURE 4) by pressure in chamber 168, ring shaped pressure plate 130, travelling with collar 122, forces pressure plates 118 and backing plates 120 into frictional engagement against surface 188 of axially stationary clutch drum 140, causing low speed forward gear 114 to rotate with cross shaft 66 to drive pinion 32. Similarly, fluid under pressure in chamber 166 will cause collar 122 to shift axially to the right (FIGURE 4) engaging pressure plates 118 and backing plates 120 of high speed forward drive between pressure plate 128 and face 190 of axially stationary clutch drum 138 to engage high speed forward gear 112 with cross shaft 66 to drive pinion 32.

Reverse drive dual friction clutch assembly 192 (see FIGURE 2) mounted on cross shaft 194 is substantially identical to combined forward dual friction clutch assembly 102 and cross shaft 66, except that input gear 64 is omitted. In view of the substantial identity between the forward drive assembly 102 and the reverse drive assembly 192, further description of the latter will be omitted.

The assembly 192 includes reverse clutch shift collar which is shiftable axially of cross shaft 194, as explained in conjunction with assembly 102. Reverse clutch shift collar 196 carries collar gear 198 which is in constant mesh with gear 136 of collar 122. High speed reverse gear 200 and low speed reverse gear 202 are rotatably mounted on cross shaft 194 for selective engagement to rotate with cross shaft 194 and drive pinion 32 by actuating one of the clutch assemblies while both forward gears 112 and 114 idle.

Reversible output shaft 380, journalled in transmission housing 73 by oppositely tapered press-fitted roller thrust bearings 388 and 390, carry splined gears 412 and 414 spaced apart by sleeve 410. Gear 412 is in constant mesh with gears 112 and 200 enabling shaft 380 to drive opinion 32 at high speed in either a forward or reverse direction while gear 414 is in constant mesh with gears 114 and 202 enabling shaft 380 to drive pinion 32 at low speed in either a forward or reverse direction.

The novel fluid control arrangement of the present invention includes structure to prevent inadvertent simultaneous engagement of both forward and reverse drive. At the same time, it is fast acting, enabling rapid change over from any forward or reverse gear to any other forward or reverse gear. Selector valve unit 204, later described, permits selective introduction of fluid into any one of the annular pressure chambers of the forward or reverse clutch assemblies, to thereby shift the flange piston of either collar 102 or collar 196 in the desired direction.

Figure 5:
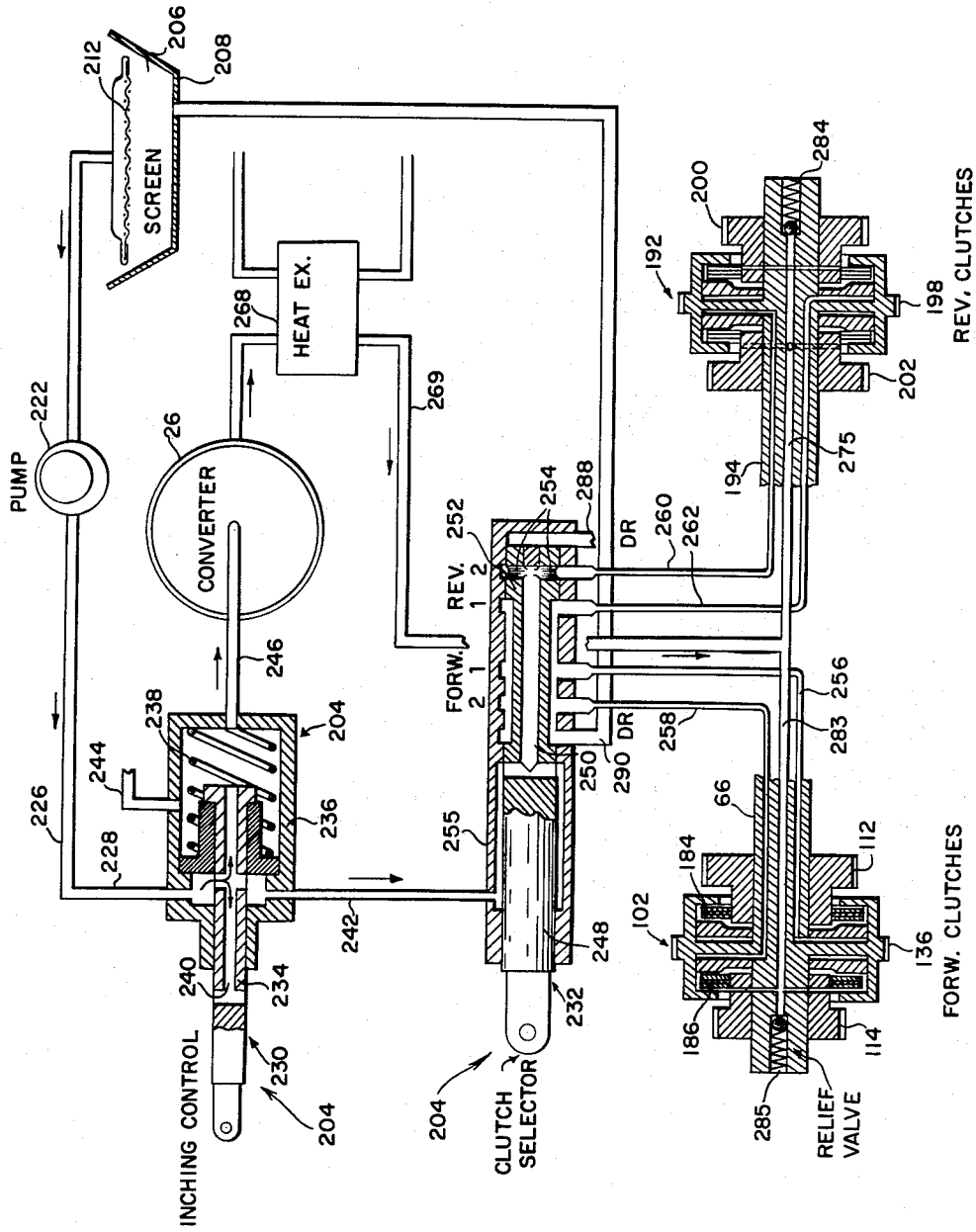
FIGURE 5 is a diagrammatic illustration of the hydraulic system used for lubricating, cooling and clutch actuation in conjunction with the transmission unit of FIGURES 2–4.

The hydraulic fluid system is schematically shown in FIGURE 5. Fluid initially is stored in sump 206 (FIGURE 4) located at the base of transmission housing 73 adjacent sump pan 208 which is secured to transmission housing 73 by cap screws. Hydraulic fluid is withdrawn from sump 206 through screen 212, preferably of fine mesh, along passages 214, 216, 218, and 220, into internal-external gear pump 222, typically having a capacity of approximately 7 gal./min. at 2000 r.p.m. Pump 222 is driven by shaft 224 (FIGURE 4) of torque converter 26.

Figure 3:
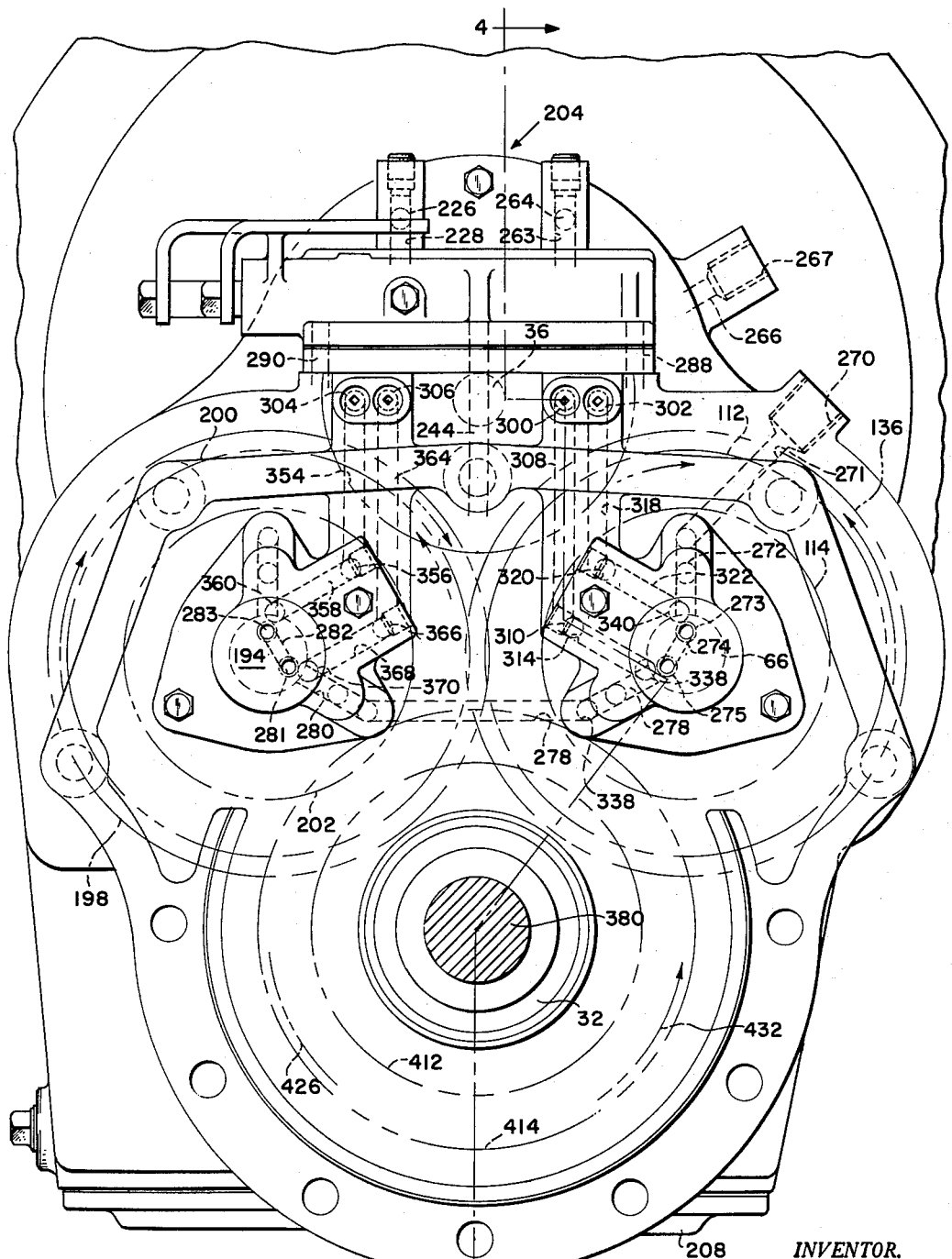
FIGURE 3 is an elavation illustrating the horizontal and vertical alignment between the forward and reverse gear trains with respect to the input and output member of the transmission of FIGURE 2.

The hydraulic fluid pressurized by pump 222 is displaced through passages located in torque converter casing 34 and transmission housing 73, passages 226 and 228 of FIGURE 3 being typical, to supply selector valve unit 204 with the fluid required.

Selector valve unit 204 is manipulatable to control the lubrication, cooling, and hydraulic pressure actuation requirements of transmission 28. Referring particularly to FIGURE 5, selector valve unit 204 has separately operable component parts, including inching control 230 and clutch selector 232. Inching control 230 controls the pressure and rate of flow of fluid conveyed to clutch selector 232 through passage 242 to selectively drive any one of the four clutch assemblies; through 246 to lubricate converter 26 and, subsequently, after passing through heat exchanger 268 and passage 269 to cool and lubricate clutch plates 118 and 120; and to exhaust through 244 to sump 206. Shaft 234 is also lubricated by passage 240.

Inching control 230 includes shaft 234 slidable within housing 236 and outwardly biased therefrom by spring 238. By manipulating shaft 234 the amount of fluid flowing in any direction may be selectively controlled; whereby the fluid pressure passing through passage 242 and clutch selector 232, into any one of the four clutch assemblies, may be increased or decreased according to load requirements.

The setting of slidable shaft 248 of clutch selector 232 in any one of five positions determines the response of transmission 28 and consequently the response of pinion 32. To neutralize all four clutch assemblies, shaft 248 is positioned within housing 255 so that its inner end 252 is located midway between the ends of passages 256 and 262 whereby fluid under pressure in passage 250 and ports 254 is blocked from all of the passages leading to the clutch assemblies. The high speed forward clutch assembly is actuated by positioning shaft 248 so that fluid under pressure is delivered to passage 256; the low-speed forward clutch assembly is actuated by positioning shaft 248 so that fluid under pressure is delivered to passage 258. Likewise, high speed reverse gear clutch assembly is actuated by utilizing passage 260, and low speed reverse clutch assembly is actuated by use of passage 262. All annular chambers, such as 166 and 168, of non-engaged clutch assemblies are vented to sump 206 through drains 288 and 290 so that fluid may be discharged therefrom and permit bellville springs, such as 170 and 172, to neutralize the clutch assemblies.

Structural passage 263, 264, and 265 of FIGURE 4 described the flow path of lubricating fluid from selector valve 204 to converter 26. This fluid is discharged from converter 26 through passage 266 and port 267 (FIGURE 3) to a heat exchanger 268 (FIGURE 5) of appropriate capacity for cooling the fluid, thereafter through passage 269 (FIGURE 5), port 270, and passage 271 (FIGURE 3) to lubricate and cool the four clutch assemblies. The two forward clutch assemblies receive this cooling and lubricating fluid through passages 271, 272, 273, 274, 275, 276, and 277, while the two reverse clutch assemblies are cooled and lubricated through passages 275, 278, 280, 282, and 283. As shown in FIGURES 4 and 5, passages 275 and 283 terminate adjacent relief valves 284 and 285, respectively, which are designed to control the magnitude of pressure in the cooling and lubricating system.

Thus, in operation, to establish high speed forward drive of pinion 32, hydraulic fluid, supplied by pump 222 to valve 204, is directed through passages 302, 318, 320, and 322, sealed annular chamber 324, and passages 336, 340, and 346, into sealed chamber 166 to move flange piston 156 and collar 122 toward the right as viewed in FIGURE 4, engaging pressure plates 118 and backing plate 120 between pressure plate 128 and surface 190 causing cross shaft 66 to drive gear 112, which in turn drives gear 312, shaft 380 and pinion 32. At the same time, the hydraulic passages and chambers of the other three clutch assembles vent to sump 206 while gears 114, 200 and 202 idle on their respective shafts.

To establish low speed forward drive of pinion 32, hydraulic fluid under pressure from valve 204 is directed through passages 300, 308, 310, and 314, sealed annular chamber 316, and passages 334, 338, and 342 into chamber 168 to move flange pistion 156 and collar toward the left as viewed in FIGURE 4, engaging pressure plates 118 and backing plates 120 between pressure plate 130 and surface 188 to drive gear 114, which drives gear 414, shaft 380 and pinion 32. Meanwhile, the hydraulic passages and chambers of the other clutch assemblies are vented to sump 206 and gears 112, 200, and 202 idle on their respective shafts.

Likewise, high speed reverse gear 200 and low speed reverse gear 202 may be individually and selectively actuated to drive pinion 32 by introducing fluid from valve 204 through passages 306, 364, 366, 368, and 370, into the annular chamber associated with the clutch drum adjacent high speed reverse gear 200 to enable shaft 194 to rotate gear 200 and thus drive gear 412, shaft 380 and pinion 32; or through passages 304, 354, 356, 358, and 360 (FIGURE 3) into the annular chamber associated with the clutch drum adjacent low speed reverse gear 202 causing shaft 194 to rotate gear 202 to drive gear 414, shaft 380 and pinion 32, respectively. Shaft 194 is power rotated by shaft 66 through constantly meshing gears 136 and 198.

While the present embodiment illustrates only two forward and two reverse driving gears it is appreciated that the invention is not limited to such but encompasses a plurality of forward and reverse driving gears and associated clutch assemblies. Furthermore, the forward and the reverse driving gears need not be numerically equal.

Thus, the present invention provides a compact, quick-responsive, versatile, multiple-speed forward and reverse transmission especially adaptable for industrial vehicle applications where rapid and frequent speed changes are constantly required. This novel transmission unit is constructed to prevent inadvertent simultaneous application of both forward and reverse clutch assemblies and provides for a novel arrangement of a plurality of forward and reverse gears and associated clutch assemblies permitting quick shifting from any one gear to any other gear, and also is light weight in construction being well balanced as a unit, the bulky eccentric conventional reverse idler arrangement having novelly been eliminated. The usual problems encountered in shift mechanisms employing shiftable gears or shift collars such as noise, excessive wear, eccentric unbalance, etc., are not present since all gears of the present invention are in constant mesh with their respective companion gears providing a sturdy, dependable, light weight transmission capable of withstanding prolonged heavy duty service. Furthermore, due to the unique arrangement of the forward and reverse gear units, the required torque capacity for all clutches is equal making it possible to use identical clutch assemblies with all forward and reverse gears.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the means and range of equivalency of the claims are therefore intended to be embraced therein.

What is claimed and desired to be secured by Letters Patent is:

1. A vehicle transmission gearing comprising a reversible output shaft, forward and reverse drive cross shafts each having rotatably mounted thereon high and low speed gears in axially spaced relation, power input means connected to said forward drive cross shaft, a high speed gear non-rotatably mounted on said output shaft meshed with the high speed gears on both of said cross shafts, a low speed gear non-rotatably mounted on said output shaft meshed with both of the low speed gears on said cross shafts, and means for selectively individually clutching any one of said high and low speed gears on said cross shafts to it associated cross shaft for driving said output shaft in either high or low speed forwardly or reversely, said clutching means comprising an axially shiftable clutch operator surrounding and drive connected to each of said cross shafts and constantly meshed gears on said clutch operators.

2. In the vehicle transmission defined in claim 1, said cross shafts having their axes disposed in a plane that is perpendicular to a plane containing the axes of said input and output shafts.

3. In the vehicle transmission defined in claim 2, said plane containing the cross shafts being substantially horizontal and said cross shaft axes lying substantially equal distances on opposite sides of the plane containing said input and output shafts.

4. In the transmission defined in claim 1, each said clutch operator being a collar carrying one of said meshed clutch operator gears, and there being separate clutches disposed between said collar and the high and low speed gears on the associated cross shaft.

5. In the transmission defined in claim 1, an axle drive gear non-rotatably mounted directly on said output shaft.

6. A vehicle transmission gearing comprising a drive input shaft having operable connection to a source of power, a reversible output shaft, forward and reverse drive cross shafts each rotatably mounting high and low speed gears in axially spaced relation, constantly meshed gearing interconnecting said input shaft and said forward drive cross shaft, a high speed gear fixed on said output shaft meshed with the high speed gears on both of said cross shafts, a low speed gear fixed on said output shaft meshed with both of the low speed gears on said cross shafts, and means for selectively clutching any one of said high and low speed gears on said cross shafts to its associated cross shaft comprising an axially shiftable clutch collar surrounding each of said cross shafts, constantly meshed gears on said collars and clutch units disposed between each of said collars and the high and low speed gears on the associated cross shaft.

7. A vehicle transmission gearing comprising a drive input shaft having operable connection to a source of power, a reversible output shaft, forward and reverse drive cross shafts each rotatably mounting high and low speed gears in axially spaced relation, constantly meshed gearing interconnecting said input shaft and said forward drive cross shaft, a high speed gear fixed on said output shaft meshed with the high speed gears on both of said cross shafts, a low speed gear fixed on said output shaft meshed with both of the low speed gears on said cross shafts, means for selectively clutching any one of said high and low speed gears on said cross shafts to its associated cross shaft comprising on each cross shaft first and second clutch members non-rotatably mounted on the cross shaft, an axially slidable clutch collar, clutch elements interposed between said clutch collar and each of the high and low speed gears on that cross shaft, and means for selectively shifting said collar in opposite directions to drive connect said clutch elements to one or the other said clutch members and thereby clutch one or the other of said gears to said cross shaft, and directly meshed gears on said collars.

8. A vehicle transmission gearing comprising a drive input shaft having operable connection to a source of power, a reversible output shaft, forward and reverse drive cross shafts each rotatably mounting high and low speed gears in axially spaced relation, constantly meshed gearing interconnecting said input shaft and said forward drive cross shaft, a high speed gear fixed on said output shaft meshed with the high speed gears on both of said cross shafts, a low speed gear fixed on said output shaft meshed with both of the low speed gears on said cross shafts, and means for selectively clutching any one of said high and low speed gears on said cross shafts to its associated cross shaft comprising clutch collars axially slidably mounted upon the repective cross shafts, means for shifting said clutch collars in opposite directions for selectively drive coupling a desired one of said clutch collars between its associated cross shaft and either the high speed or low speed gear on that cross shaft, said collar having an intermediate neutral clutch disengaged position, and directly meshed gears on said clutch collars.

References Cited by the Examiner
UNITED STATES PATENTS

| | | | |
|---|---|---|---|
| 2,953,942 | 9/1960 | Schwartz et al. | 74—361 |
| 2,972,901 | 2/1961 | Gerst | 74—360 |
| 3,003,606 | 11/1961 | Hindmarch | 74—360 |
| 3,064,488 | 11/1962 | Lee et al. | 74—360 |

DAVID J. WILLIAMOWSKY, *Primary Examiner.*

DON A. WAITE, *Examiner.*

HENRY S. LAYTON, *Assistant Examiner.*